United States Patent [19]

Mallonee

[11] Patent Number: 5,460,672

[45] Date of Patent: Oct. 24, 1995

[54] APPARATUS AND METHOD FOR JOINING A PLURALITY OF TEXTILE WEBS TOGETHER IN SIDE-BY-SIDE RELATION

[75] Inventor: Jerry M. Mallonee, Hickory, N.C.

[73] Assignee: Petco, Inc., Newton, N.C.

[21] Appl. No.: 233,469

[22] Filed: Apr. 26, 1994

[51] Int. Cl.[6] ................................................. B32B 31/16
[52] U.S. Cl. .................... 156/73.4; 156/184; 156/301; 156/302; 156/324; 156/544; 156/554; 156/580.1; 242/520; 493/410
[58] Field of Search ................................. 156/73.1, 73.4, 156/184, 301, 302, 324, 544, 580.1, 580.2, 157, 159, 554; 493/409, 410, 411; 242/520, 535

[56] References Cited

U.S. PATENT DOCUMENTS

| | | | |
|---|---|---|---|
| Re. 33,063 | 9/1989 | Obeda | 156/73.1 |
| 2,553,923 | 5/1951 | Lambert | 242/1 |
| 2,683,679 | 7/1954 | Hurd et al. | 428/57 |
| 3,519,507 | 7/1970 | Pierson | 156/73.4 |
| 3,681,176 | 8/1972 | Hauser et al. | 156/580.2 |
| 3,767,510 | 10/1973 | Gustafson | 156/494 |
| 3,852,144 | 12/1974 | Parry | 156/510 |
| 3,927,233 | 12/1975 | Naidoff | 428/58 |
| 3,947,619 | 3/1976 | Wank | 428/57 |
| 4,227,959 | 10/1980 | Brown | 156/515 |
| 4,435,457 | 3/1984 | Servo et al. | 428/58 |
| 4,496,407 | 1/1985 | Lowery, Sr. et al. | 156/73.3 |
| 4,534,819 | 8/1985 | Payet et al. | 156/515 |
| 4,560,427 | 12/1985 | Flood | 156/73.3 |
| 4,693,771 | 9/1987 | Payet et al. | 156/73.3 |
| 4,711,693 | 12/1987 | Holze, Jr. | 156/580.1 |
| 4,713,131 | 12/1987 | Obeda | 156/73.1 |
| 4,938,817 | 7/1990 | Langley | 156/73.1 |
| 5,092,831 | 3/1992 | James et al. | 493/410 X |
| 5,232,529 | 8/1993 | Miyake | 156/73.4 |

*Primary Examiner*—David A. Simmons
*Assistant Examiner*—J. Sells
*Attorney, Agent, or Firm*—Allen, Dyer, Doppelt, Franjola & Milbrath

[57] ABSTRACT

An apparatus for joining a plurality of textile webs together in side-by-side relation includes a feeder for positioning a first textile web overlying a second textile web and advancing the textile webs along a predetermined path of travel, an ultrasonic horn and anvil for forming a relatively narrow flexible joint between the textile webs by heat fusing together adjacent portions thereof, and an unfolding frame for unfolding the textile webs about the joint so that the textile webs lie in a common plane to define the relatively wide textile fabric. More particularly, in order to form the convolute roll of the relatively wide textile fabric, the apparatus also preferably includes a driven take-up spindle positioned downstream from the unfolding frame to wind the relatively wide textile fabric into successive convolute wound layers. Accordingly, the relatively narrow flexible joint is thus folded to lie flat between successive layers so that the successive convolute wound layers define a cylindrical convolute roll being devoid of a substantial bulge at the joint. An associated method is also disclosed.

26 Claims, 6 Drawing Sheets

APPARATUS AND METHOD FOR JOINING A PLURALITY OF TEXTILE WEBS TOGETHER IN SIDE-BY-SIDE RELATION

FIELD OF THE INVENTION

The present invention relates to the field of equipment and methods for making textile fabrics, and more particularly, to an apparatus and method for making a relatively wide textile fabric from a plurality of textile webs joined together in side-by-side relation.

BACKGROUND OF THE INVENTION

Many textile manufacturing operations produce side trims of textile webs, such as nonwoven textile webs used for bedding products. These side trims are often of first quality nonwoven textile material, such as polyester or polypropylene. However, these side trims are typically not sufficiently wide to be readily used for other textile products. For example, a side trim less than about 60 inches has a relatively low commercial value, while side trims in the 30 to 40 inch range are quite commonly produced and available, yet which also have relatively little commercial value. Typical bedding product related applications use textile fabrics having widths in the range of 86 to 104 inches, with 96 inches being a common commercially desired width. Accordingly, the relatively narrow side trims are often disposed of as waste at an additional expense to the manufacturer.

Various efforts have been attempted to join or otherwise connect two or more such side trims into a textile fabric having a sufficiently large width to be useful in forming bedding products, such as a backing for a mattress cover. A mattress cover typically includes a nonwoven textile fabric as the backing, an overlying layer of fiberfill, and an outer fabric layer or ticking. The backing layer simply serves to permit quilting of the ticking and fiberfill together to form an integral unit.

Figure 1:
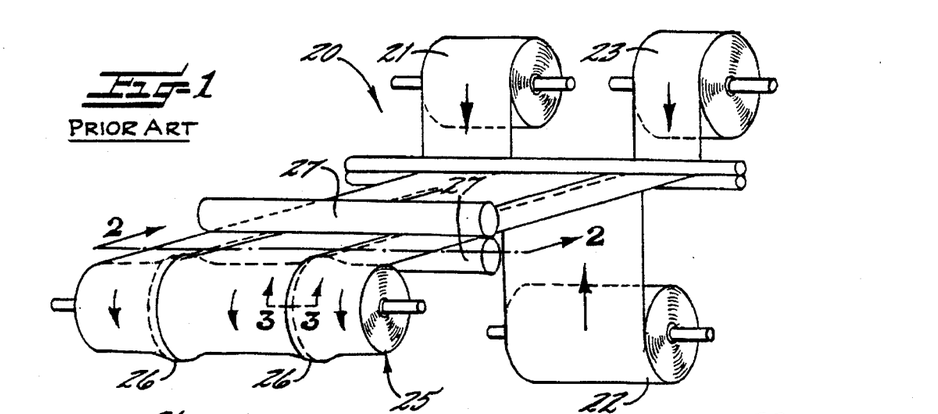
FIG. 1 is a schematic perspective view of a heat calendaring apparatus for joining textile webs as in the prior art.
Figure 2:
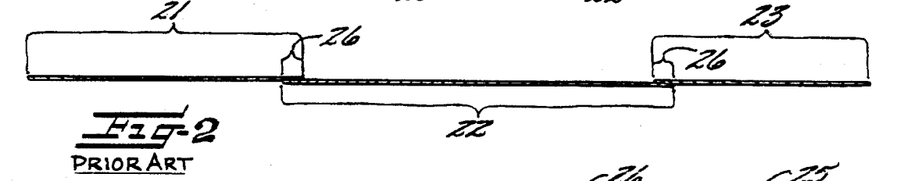
FIG. 2 is an enlarged cross-sectional view of a textile fabric as in the prior art taken along lines 2—2 of FIG. 1 and as produced using the prior art apparatus as shown in FIG. 1.
Figure 3:
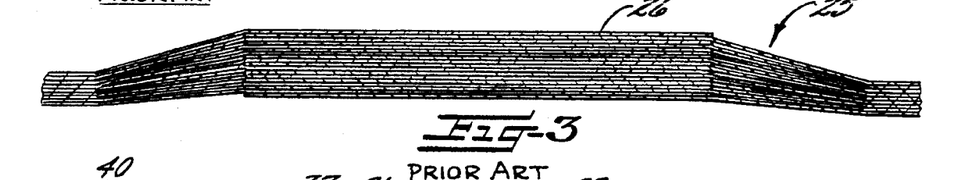
FIG. 3 is a greatly enlarged cross-sectional view of a bulging portion of textile fabric as in the prior art taken along lines 3—3 of FIG. 1.

Referring to FIGS. 1–3, a prior attempt by the inventor of the present invention is explained, wherein the inventor joined together three side trims, or textile webs 21, 22 and 23, to form a wider textile fabric using a heat calendaring apparatus 20 (FIG. 1). More particularly, side edges of adjacent textile webs were overlapped several inches and heated under pressure by suitable heating means, such as a pair of heated calender rolls 27, to form overlapping seams or joints 26, thereby joining the adjacent webs together.

Unfortunately, the overlapped joints 26 represented essentially a double thickness of material which, when arranged in the plurality of convolute wound layers, tended to form bulges in the convolute roll of the textile fabric 25. Moreover, these bulges introduced biases into the textile fabric which could not be readily removed upon unwinding of the fabric from the roll and thereby rendered the biased textile fabric unsuitable for many potential applications, including the backing layer for a mattress cover. In addition, polypropylene, a common nonwoven textile material, could not be used in the heat calendaring process.

SUMMARY OF THE INVENTION

In view of the foregoing background it is therefore an object of the present invention to provide an apparatus and method for forming a relatively wide textile fabric by joining a plurality of textile webs, such as textile side trims, together in side-by-side relation.

It is another object of the present invention to provide an apparatus and method for forming a relative wide textile fabric formed from a plurality of textile webs that may be wound into convolute roll form without imparting undesirable biases into the textile fabric and without undesirable bulges at the joints.

These and other objects, features and advantages of the present invention are provided by an apparatus for forming a relatively wide textile fabric from a plurality of textile webs wherein the apparatus includes feeder means for positioning a first, or upper, textile web overlying a second, or base, textile web and advancing the textile webs along a predetermined path of travel; welding means for forming a relatively narrow flexible joint between the textile webs by heat fusing together adjacent portions thereof; and an unfolding frame for unfolding the textile webs about the joint so that the textile webs lie in a common plane to define the relatively wide textile fabric. More particularly, in order to form the convolute roll of the relatively wide textile fabric, the apparatus also preferably includes take-up means positioned downstream from the unfolding frame to wind the relatively wide textile fabric into successive convolute wound layers. Accordingly, the relatively narrow flexible joint is thus folded to lie flat between successive layers so that the successive convolute wound layers define a cylindrical convolute roll being devoid of a substantial bulge at the joint.

As used herein, the terms "textile fabric" or "relatively wide textile fabric" are used to define the resultant textile product of joining together a plurality of "textile webs". As would be readily understood by those skilled in the art, the textile webs and the textile fabric are formed of the same nonwoven heat fusible textile material, such as polyester or polypropylene. Commercially undesirable side trims may thus be joined to provide a commercially valuable relatively wide textile fabric.

All of the textile webs may have a same predetermined thickness. The welding means preferably includes means for pressing together the adjacent portions of the textile webs so that the joint has a thickness less than the predetermined thickness of the textile webs. In addition, the welding means also preferably includes trimming means for trimming portions of heat fused material from the joint so that the joint has a relatively narrow width outward from the textile fabric less than about five times the predetermined thickness of the textile webs.

Another feature of the invention is that the relatively narrow joint may be axial offset slightly in successive convolute wound layers by the take-up means. Accordingly, the likelihood of forming a bulge and imparting undesirable biases in the textile fabric is further avoided. A random offset may be obtained by the take-up means in view of the relative narrow width of the joint and the speed of operation of take-up.

The welding means is preferably provided by an ultrasonic horn cooperating with an opposing ultrasonic anvil. The feeder means preferably includes means for relatively positioning the first and second textile webs so that respective first longitudinal edges of the first and second textile webs are generally aligned with each other. Accordingly, the ultrasonic horn and anvil cooperate to form the joint from respective first longitudinal edge portions of the textile webs.

The plurality of textile webs joined together may also be three in a preferred embodiment of the invention. Thus, the feeder means preferably further includes means for positioning a third textile web on the second textile web so that a longitudinal edge of the third textile web is generally aligned with a second longitudinal edge of the second textile web. In addition, the welding means also preferably includes means for forming a second relatively narrow flexible joint between the second and third textile webs by heat fusing together adjacent respective edge portions thereof. In this embodiment, the unfolding frame also further includes means for unfolding the second and third textile webs about the second joint so that the third textile web lies in the common plane with the other textile webs to further define the relatively wide textile fabric.

A method aspect according to the present invention includes the steps of positioning a first textile web overlying a second textile web while advancing the first and second textile webs along a predetermined path of travel; forming a relatively narrow flexible joint between the textile webs by heat fusing together adjacent portions thereof as the textile webs are moved along the predetermined path of travel; and unfolding the thus joined textile webs about the joint so that the textile webs lie in a common plane to define the relatively wide textile fabric. The method also preferably includes the step of winding the relatively wide textile fabric into successive convolute wound layers with the relatively narrow flexible joint folded to lie flat between successive layers so that the successive convolute wound layers define a cylindrical convolute roll being devoid of a substantial bulge at the joint. As discussed above, a third textile web may be joined to the second textile web to form an even wider overall textile fabric.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout and prime notation is used to indicate similar elements of alternate embodiments.

Referring now first to FIGS. 4–8, a first illustrated embodiment of the apparatus 20 for producing a first embodiment of textile fabric 30 according to the invention is described. The textile fabric 30 includes a plurality of textile webs, such as the medial 31 and two side webs 32 and 33 in the illustrated embodiment, joined together in side-by-side relation. A respective joint 35 (FIG. 6) having a generally strip-like shape joins each pair of adjacent textile webs. Each joint 35 is formed from edge portions of respective adjacent webs being heat fused together so that each joint extends outwardly from a predetermined face of the textile fabric 30. Each joint 35 preferably extends continuously along an entire length of the textile webs.

Figure 4:
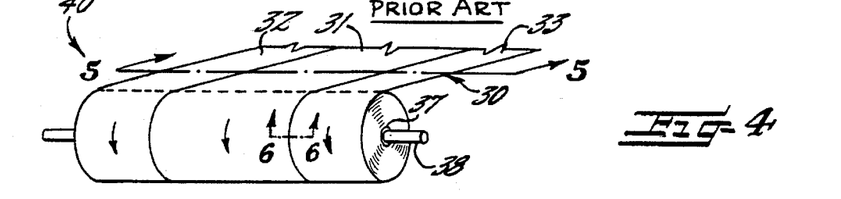
FIG. 4 is a perspective view of a convolute roll of the textile fabric produced using the apparatus and method according to the present invention.
Figure 5:
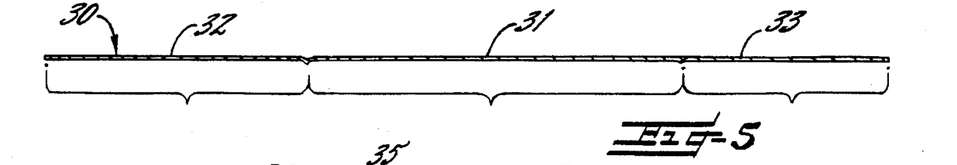
FIG. 5 is an enlarged cross-sectional view of the textile fabric taken along lines 5—5 of FIG. 4.
Figure 6:
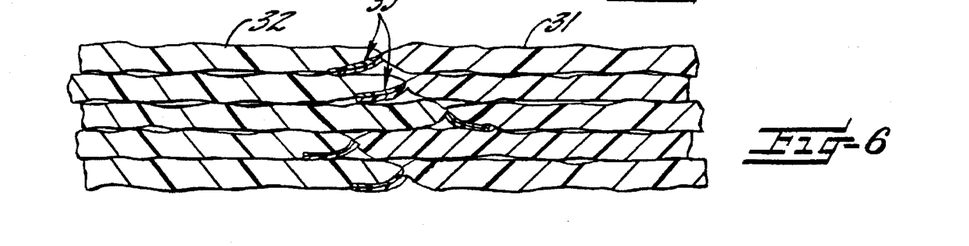
FIG. 6 is a greatly enlarged cross-sectional view of a portion of the textile fabric taken along lines 6—6 of FIG. 4.

Each of the textile webs 31, 32 and 33 may be provided by commercially available first quality side trims including a nonwoven heat fusible textile material. For example, side trims produced as a result of making a backing layer for a mattress cover, may typically be available in convolute roll form having widths less than about 60 inches and more commonly ranging between about 30 to 40 inches. Thus, the overall width of the textile fabric 30 is desirably in the range of about 86 to 104 inches, with 96 inches being a commercially preferred width, for example.

All of the textile webs 31, 32 and 33 preferably also include the same nonwoven heat fusible textile material, such as including spunbonded or meltblown polyester or polypropylene. Those having skill in the art will recognize other suitable nonwoven textile materials. The nonwoven textile material of the webs 31, 32 and 33 also preferably has a relatively soft hand. In addition, the textile material of the textile webs is preferably relatively lightweight having a weight in a range between about ½ to 2 ounces, and more preferably, in the range of about ½ to 1 ounces.

The textile fabric 30 is preferably manufactured and provided to end users as a convolute roll 40 including a plurality of convolute wound layers as shown in FIG. 3. The convolute roll 40 may be wound upon a tubular core 37 and supported on a spindle 38 as would be readily understood by those skilled in the art. The convolute roll 40 facilitates take-up during the manufacturing process of the textile fabric 30, permits convenient storage and transportation of the textile fabric, and facilitates delivery of the textile fabric into an apparatus of the end user.

As shown in the illustrated embodiment, each of the textile webs 31, 32 and 33 preferably has a respective substantially uniform width throughout an entire length thereof. As shown perhaps best in the greatly enlarged view of FIG. 6, each joint 35 lies substantially flat (FIG. 6) on a respective textile web 31 or 32 in successive convolute wound layers because of the flexibility of the joint, and each joint is relatively thin. Accordingly, although the joint 35 in successive layers is somewhat aligned because of the uniform width of the textile webs 31, 32 and 33, the convolute wound layers still define a cylindrical shape for the outer surface of the convolute roll 40. In other words, the convolute roll 40 is devoid of a substantial bulge at each joint 35, in sharp contrast to the heat calendared textile fabric forming a convolute roll 25 as in the prior art (FIGS. 1–3).

The joints 35 according to the invention provide a sufficiently strong connection between adjacent textile webs, and, moreover, impart substantially no bias to the convolute roll 40 of the textile fabric 30. For example, for a backing for a mattress cover, the strength of the joint 35 need be about only 50% of the strength of the textile web. The backing layer need only permit quilting or stitching of the mattress ticking and fiberfill layer. Thus, the textile fabric 30 according to the invention may readily be used as a backing for a mattress cover. Those of skill in the art will readily envision other uses and applications for the relatively wide textile fabric 30.

Figures 14, 15, 16, 17:
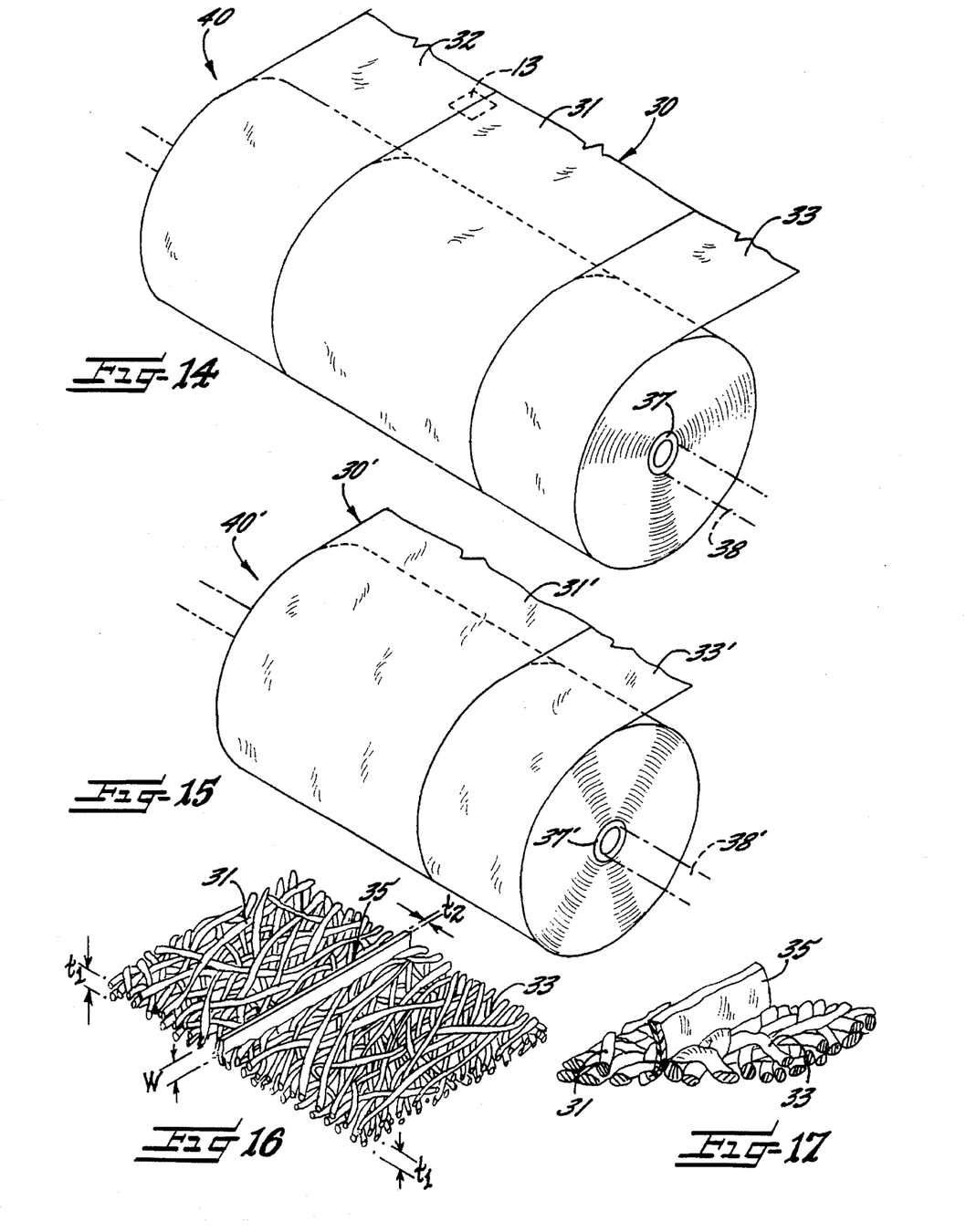
FIG. 14 is a perspective view of a first embodiment of a convolute roll of textile fabric produced using the first embodiment of the apparatus according to the invention as shown in FIG. 7.
FIG. 15 is a perspective view of a second embodiment of a convolute roll of textile fabric produced using the second embodiment of the apparatus according to the invention as shown in FIG. 18.
FIG. 16 is an enlarged schematic perspective view of a portion a joint and adjacent portion of textile fabric produced by the apparatus according to the present invention.
FIG. 17 is a greatly enlarged schematic perspective view of a portion the joint and adjacent portion of textile fabric as shown in FIG. 16.

Referring briefly now additionally to the greatly enlarged views of FIGS. 16 and 17, further aspects of the joint 35 and textile webs 31, 32 and 33 are explained. Each joint 35 is flexible and extends outwardly from the respective textile webs 31 and 32 so that the joint is readily folded to lie flat on a respective textile web (FIG. 6). In addition, each textile web 31, 32 and 33 preferably has a same predetermined thickness $t_1$, and each joint has a predetermined width w extending outwardly from the textile webs being less than about five times the predetermined thickness $t_1$ of the textile webs. For example, the predetermined thickness $t_1$ of the textile webs may be in the range of about 0.002 to 0.025 inches. Each joint 35 also preferably has a thickness $t_2$ less that the predetermined thickness $t_1$ of the textile webs.

Each joint 35 has a relatively narrow width w, and the plurality of convolute wound layers have slight variations in axial alignment. In addition, the joint 35 may be folded to the left or right and vary randomly in its direction of fold throughout the entire length of the textile fabric 30. Accordingly, the joint 35 is randomly slightly axially offset in the convolute wound layers (FIG. 6) during the winding or take-up step as described in greater detail below; thus, producing a somewhat random offset in the joint to further avoiding any biasing of the textile fabric 30 as occurred in the heat calendared overlapping seams 24 of the prior art (FIGS. 1–3). The textile fabric 30 according to the present invention is also described in an application by the present applicant concurrently filed and entitled *"Textile Fabric Formed of a Plurality of Textile Webs Joined Together in Side-By-Side Relation"*, U.S. patent application Ser. No. 08/233,530 filed Apr. 26, 1994, the entire disclosure of which is incorporated herein by reference.

Referring now to FIGS. 7 through 13, an first embodiment of the apparatus 50 and for making the first embodiment of the textile fabric 30 according to the invention is explained. The apparatus 50 is for making the embodiment of the textile fabric 30 including three textile webs, that is, with a medial or base web 31, and two side or upper webs 32, 33. The apparatus 50 includes a supply source 51 for mounting respective rolls of the three textile webs to permit delivery of the webs. A series of rollers 52 provides a predetermined path through which the webs 31, 32 and 33 are advanced as would be readily understood by those skilled in the art. Stated simply, the supply source 51 and rollers 52 provide feeder means for relatively positioning the webs and advancing the webs along a predetermined path of travel.

Figure 7:
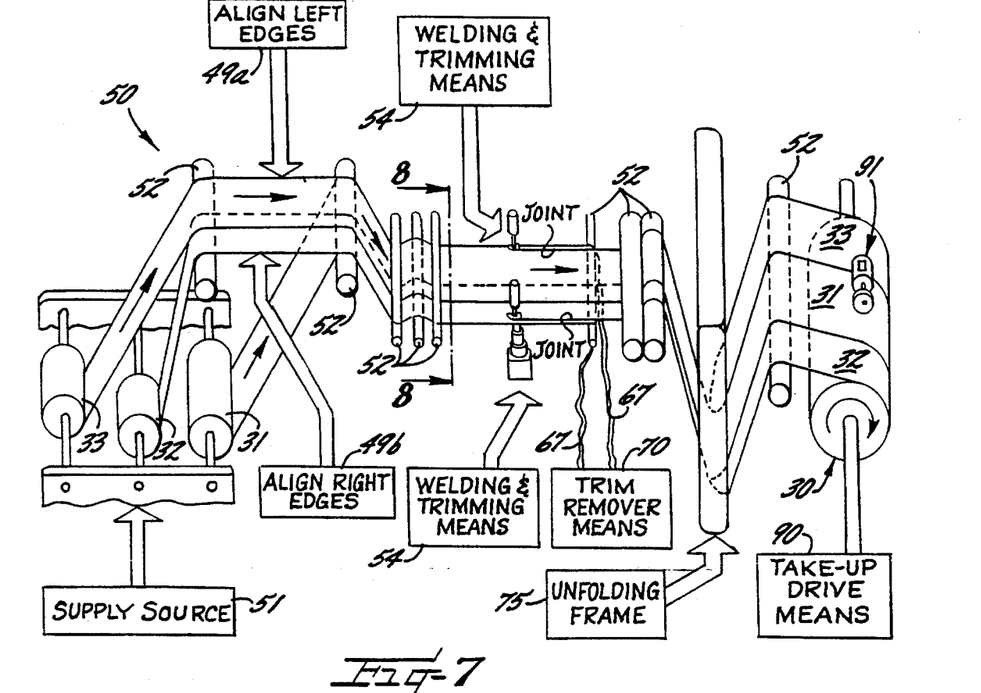
FIG. 7 is a perspective schematic view of first embodiment of the apparatus according to the invention.

In a preferred embodiment the base or medial web 31 is wider than either of the upper webs 32, 33. Accordingly, the two upper webs 32, 33 are readily positioned overlying the base web 31 with respective left and right edges generally aligned as illustrated by blocks 49a, 49b.

The three aligned textile webs 31, 32 and 33 are advanced along the predetermined path of travel to the welding means 54 which also includes means for trimming the excess material to the relatively narrow joint 35 between adjacent webs. The trimmed material 67 may be readily removed by trim remover means 70, such as by conventional suction nozzles, as would be readily understood by those skilled in the art.

Figure 8:
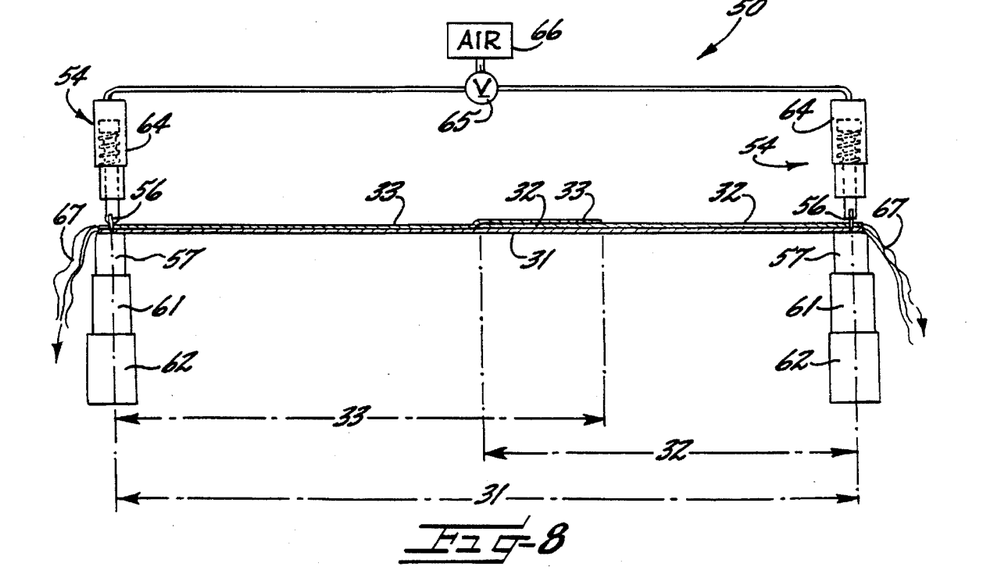
FIG. 8 is an enlarged cross-sectional view taken along lines 8—8 of FIG. 7.

Referring now more particularly to FIG. 8, the welding means is preferably provided by an ultrasonic horn 57 and associated rotating anvil 56 to weld or heat fuse overlapping edge portions of the textile webs together, while simultaneously trimming off any excess material. The anvil 56 preferably has a predetermined contacting surface to simultaneously weld the textile material to form the joint 35 and cut the trimmed material 67. The anvil 56 is also preferably downwardly biased to provide a predetermined pressure. The biasing is illustratively achieved by a pneumatic air supply 66 and a control valve 65 in communication with a piston 64, in turn, coupled to the anvil, as would be readily understood by those skilled in the art. As would also be readily understood by those skilled in the art, an ultrasonic transducer 61 and booster or amplifier 62 also preferably cooperate to form the ultrasonic welding and trimming means. The pneumatically operated piston 64 provides means for pressing together the adjacent portions of the textile webs so that the joint 35 has a thickness less than a predetermined thickness of the textile webs 31, 32 and 33. Examples of ultrasonic welding apparatus can be found in U.S. Pat. Nos. 4,693,771 and 4,534,819 to Payer et al.; U.S. Pat. No. 4,496,407 to Lowery, Sr. et al.; and U.S. Pat. No. 4,227,959 to Brown, the entire disclosures of each being incorporated herein by reference.

The ultrasonic welding and trimming tends to make the joint 35 thinner than the textile webs 31, 32 and 33 as discussed above. The joint 35 is also somewhat flexible, being formed from the heat fused edges of the textile webs 31, 32 and 33. Thus, in freestanding sheet form, the joint 35 may extend outwardly from the textile fabric, yet be readily folded flat with the respective textile web portions when wound into successive layers defining the convolute roll 40.

As also illustrated in FIG. 8, the two side webs 32, 33 may overlap depending on the length of the respective webs 31, 32 and 33 and the desired width of the textile fabric 30 produced by the apparatus 50.

Returning now again to FIG. 7 and additionally to FIGS. 9–13, the unfolding frame is explained. The unfolding frame includes a fixed frame member 76 and a pair of triangular shaped wing members 77, 78. The fixed frame member 76 includes side-by-side slots 80, 81 on an upper portion and cooperating with respective fasteners 82, 83 to facilitate adjusting the relative spacing of the wing members 77, 78 to accommodate different widths of the joined together webs 31, 32 and 33.

Figure 9:
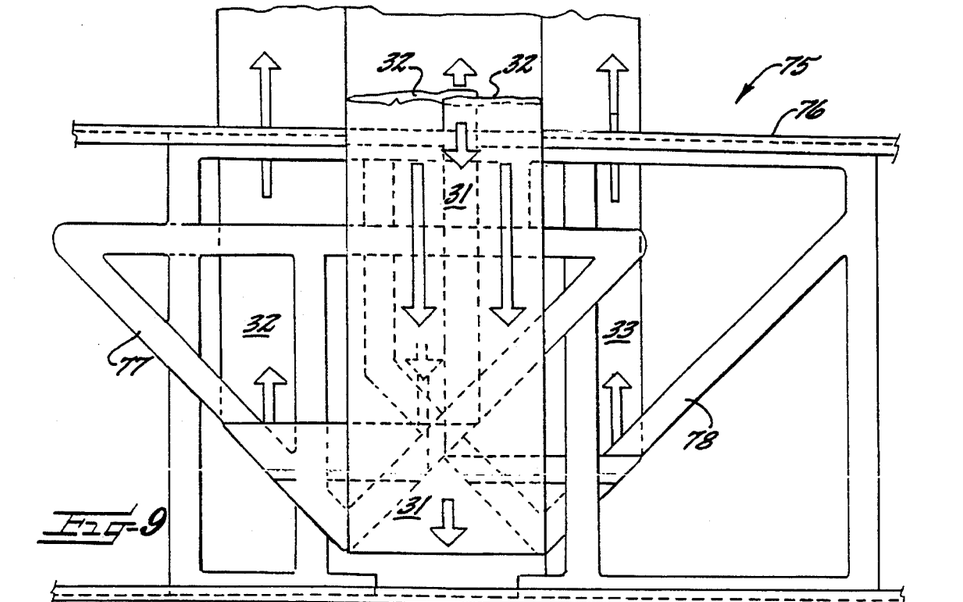
FIG. 9 is a greatly enlarged view of the unfolding frame of the apparatus according to the invention viewed from the upstream side.
Figure 10:
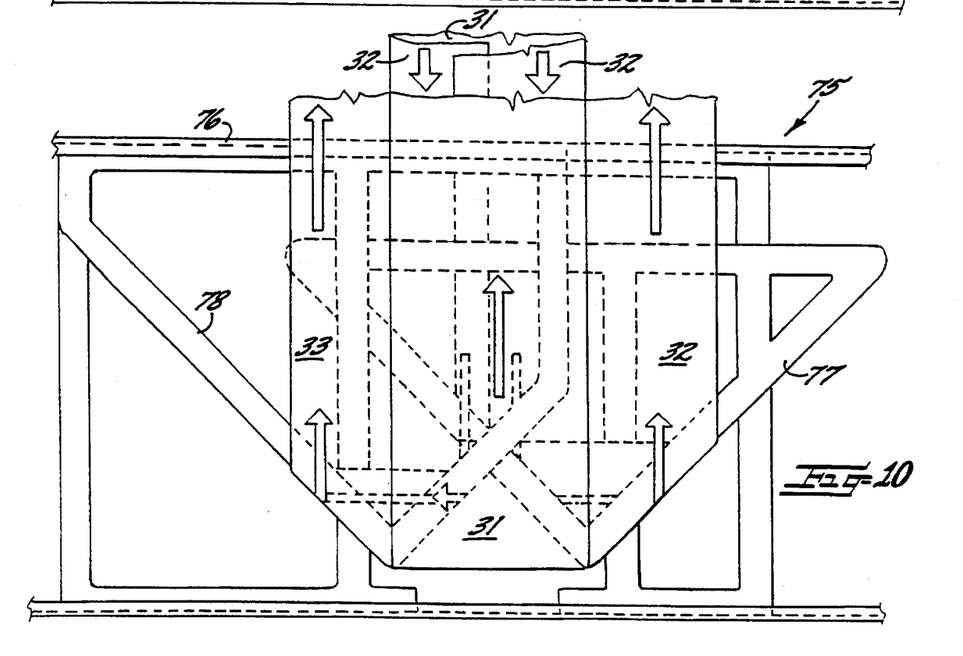
FIG. 10 is a greatly enlarged view of the unfolding frame of the apparatus according to the invention viewed from the downstream side.
Figures 11, 12, 13:
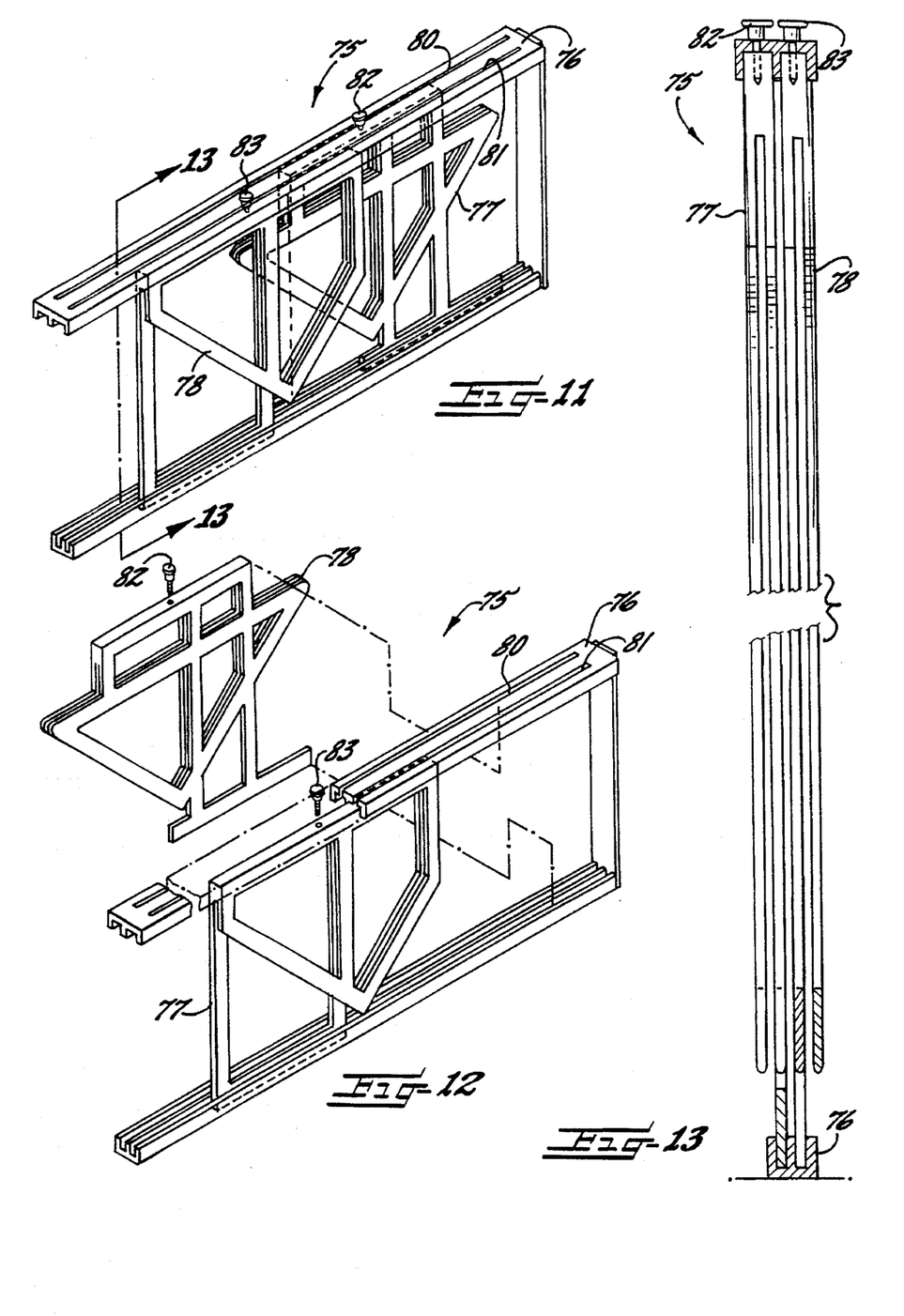
FIG. 11 is a perspective view of the unfolding frame of the apparatus according to the invention with the textile fabric removed for greater clarity.
FIG. 12 is an exploded view of the unfolding frame as illustrated in FIG. 11.
FIG. 13 is a cross-sectional view of the unfolding frame as taken along lines 13—13 of FIG. 11.

The folded joined webs from the welding means 54 enter the unfolding frame 75 as shown in FIG. 9. The left web 32 as shown in FIG. 9 engages the lower triangular guide portion of the left wing member 77 so that the joint 35 aligns with the apex of the triangular guide portion. Accordingly, the left web 32 is unfolded while passing through the left wing 77. Similarly, the right web 33 shown in FIG. 9 is unfolded by the right wing member 78 as would be readily understood by those skilled in the art.

Referring again to FIG. 7, the unfolded textile webs 31, 32 and 33 define the textile fabric 30. Take-up means 90 is positioned downstream from the unfolding frame 75 to take up the textile fabric 30 in convolute roll form producing the convolute roll 40 as discussed extensively above. The take-up means 90 includes a conventional spindle and a drive motor, not shown, for winding the textile fabric 30 into a plurality of convolute wound layers. Because of the relatively narrow width of the joints 35, the joints are inherently slightly offset in an axial direction by the take-up means to thereby further prevent a substantial bulge from appearing on the convolute roll 40. To record the amount of textile fabric 30 accumulated on the convolute roll 40, a conventional yardage counter 91 may be positioned on the roll as shown in FIG. 7.

Figure 18:
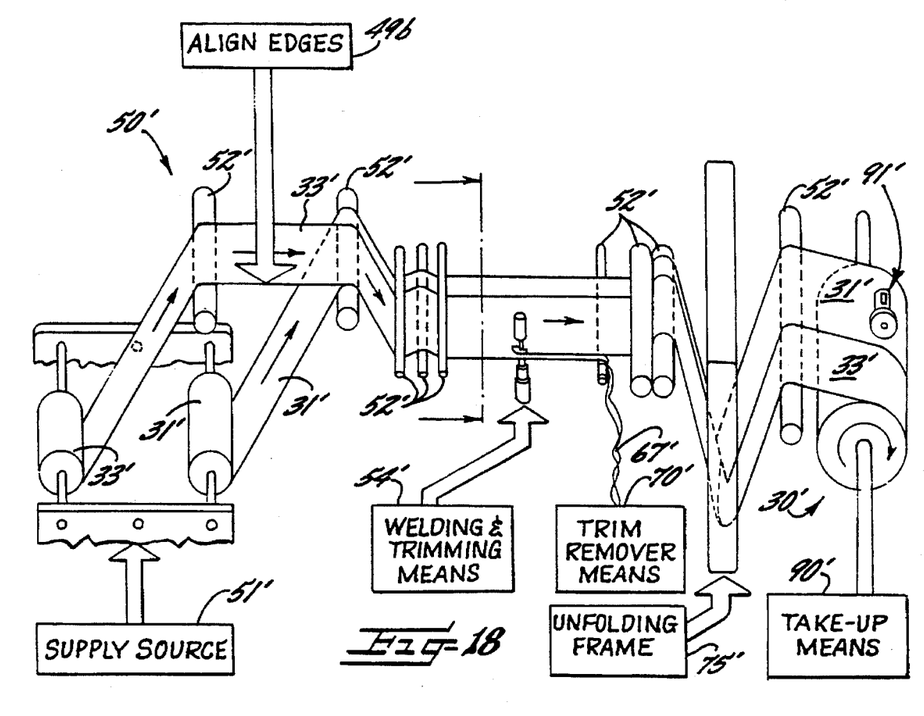
FIG. 18 is a perspective schematic view of a second embodiment of the apparatus according to the invention.
Figure 19:
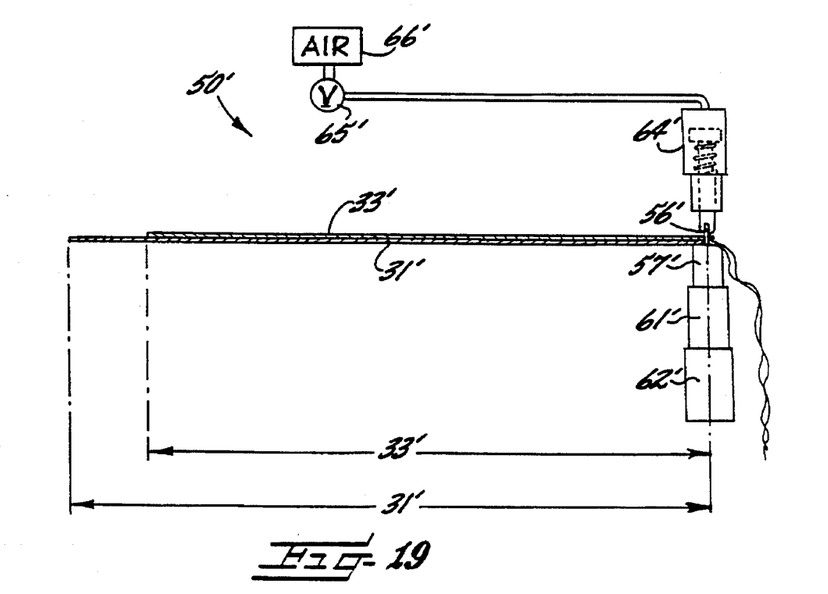
FIG. 19 is an enlarged cross-sectional view taken along lines 19—19 of FIG. 18.

Referring now to FIGS. 18, 19 and 15, a second embodiment of the apparatus 50' is illustrated for forming the second embodiment of the textile fabric 30' as shown in FIG. 15. Since the second embodiment of the textile fabric 30' is formed from only two textile webs 31', 33' the apparatus includes a supply source 51' including only two rolls of the textile webs. The other elements of this second embodiment of the apparatus 50' according to the invention include similar numbers as the above described three-web embodiment of the apparatus 50. Accordingly, the elements of this second embodiment of the apparatus 50' will be fully understood by those skilled in the art without further description.

A method aspect of the present invention is for forming the relatively wide textile fabric by joining together a plurality of textile webs in side-by-side relation. For illustration purposes, reference numerals relating to the second embodiment of the invention are primarily used to explain the method according to the invention. The method includes the steps of: positioning a first textile web 33' overlying a second textile web 31' while advancing the first and second textile webs along a predetermined path of travel; forming a relatively narrow flexible joint 35' between the first and second textile webs by heat fusing together adjacent portions thereof as the textile webs are moved along the predetermined path of travel; and unfolding the thus joined first and second textile webs 33', 31' about the joint 35 so that the first and second textile webs lie in a common plane to define the relatively wide textile fabric 30'. The method also preferably includes the step of winding the relatively wide textile fabric 30' into successive convolute wound layers with the relatively narrow flexible joint folded to lie flat between successive layers so that the successive convolute wound layers define a cylindrical convolute roll 40' being devoid of a substantial bulge at the joint.

The step of winding the relatively wide textile fabric also preferably includes winding the successive convolute layers of the textile fabric 30' with variations in axial alignment so that the relatively narrow joint 35' is offset throughout the plurality of convolute wound layers. In addition, since the first and second textile webs preferably have a predetermined thickness, the step of forming the joint further preferably includes pressing together the adjacent portions of the textile webs so that the joint 35' has a thickness less than the predetermined thickness of the textile webs. A trimming step is also preferably performed substantially simultaneously with the welding step by an ultrasonic horn 57' and anvil 56' for trimming portions of heat fused textile material at the joint so that the joint is less than about five times the predetermined thickness of the textile webs.

The step of positioning the first and second textile webs 31', 33' further preferably includes relatively positioning the textile webs so that respective first longitudinal edges of the textile webs are generally aligned with each other. As would be readily understood in view of the description relating to the first embodiment of the apparatus 50 according to the invention, a third web 32 may also be preferably positioned, welded and unfolded according to the method of the present invention.

Many modifications and other embodiments of the invention will come to the mind of one skilled in the art having the benefit of the teachings presented in the foregoing descriptions and the associated drawings. For example, while embodiments of the textile fabric 30, 30' have been illustrated formed with three and two textile webs, respectively, those of skill in the art will readily appreciate that a greater number of textile webs may also be joined together. To do so, multiple passes may be made through the apparatus as illustrated, for example. Therefore, it is to be understood that the invention is not to be limited to the specific embodiments disclosed, and that modifications and embodiments are intended to be included within the scope of the appended claims.

That which is claimed:

1. A method for forming a convolute roll of a relatively wide textile fabric by joining together a plurality of textile webs in side-by-side relation, each of the textile webs comprising heat fusible nonwoven textile material, said method comprising the steps of:

positioning a first textile web overlying a second textile web while advancing the first and second textile webs along a predetermined path of travel;

forming a relatively narrow flexible joint between the first and second textile webs by heat fusing together adjacent portions thereof as the textile webs are moved along the predetermined path of travel;

unfolding the thus joined first and second textile webs about the joint so that the first and second textile webs lie in a common plane to define the relatively wide textile fabric and so that the relatively narrow flexible joint extends outwardly from adjacent portions of the relatively wide textile fabric; and winding the relatively wide textile fabric into successive convolute wound layers with the relatively narrow flexible joint folded to lie flat between successive layers so that the successive convolute wound layers define a cylindrical convolute roll being devoid of a substantial bulge at the joint.

2. A method according to claim 1 wherein the step of winding the relatively wide textile fabric comprises winding the successive convolute wound layers of the textile fabric with variations in axial alignment among the layers so that the relatively narrow joint is offset throughout the successive convolute wound layers.

3. A method according to claim 1 wherein the first and second textile webs have a predetermined thickness, and wherein the step of forming the joint further comprises pressing together the adjacent portions of the first and second textile webs so that the joint has a thickness less than the predetermined thickness of the textile webs.

4. A method according to claim 3 further comprising the step of trimming predetermined portions of heat fused textile material at the joint so that the joint has a relatively narrow width of less than about five times the predetermined thickness of the textile webs.

5. A method according to claim 1 wherein the step of forming the joint comprises ultrasonically welding the adjacent portions of the first and second textile webs.

6. A method according to claim 1 wherein the step of positioning the first and second textile webs further comprises relatively positioning the first and second textile webs so that respective first longitudinal edges of the first and second textile webs are generally aligned with each other.

7. A method according to claim 6 further comprising the steps of:

positioning a third textile web on the second textile web so that a longitudinal edge of the third textile web is generally aligned with a second longitudinal edge of the second textile web;

forming a second relatively narrow flexible joint between the second and third textile webs by heat fusing together adjacent portions of the second and third textile webs; and wherein said unfolding step further includes unfolding the second and third webs about the second joint so that all of the webs lie in a common plane to further define the relatively wide textile fabric.

8. An apparatus for forming a convolute roll of a relatively wide textile fabric by joining together a plurality of textile webs in side-by-side relation, each of the textile webs comprising heat fusible nonwoven textile material, said apparatus comprising:

feeder means for positioning a first textile web overlying a second textile web and advancing the textile webs along a predetermined path of travel;

welding means positioned along the predetermined path of travel for forming a relatively narrow flexible joint between the first and second textile webs by heat fusing together adjacent portions thereof;

an unfolding frame positioned downstream from said welding means for unfolding the first and second textile webs about the joint so that the textile webs lie in a common plane to define the relatively wide textile fabric and so that the relatively narrow flexible joint extends outwardly from adjacent portions of the relatively textile wide fabric; and take-up means positioned downstream from said unfolding frame to wind the relatively wide textile fabric into successive convolute wound layers with the relatively narrow flexible joint folded to lie flat between successive layers so that the successive convolute wound layers define a cylindrical convolute roll being devoid of a substantial bulge at the joint.

9. An apparatus according to claim 8 wherein said take-up means comprises means for winding successive convolute wound layers of the textile fabric with variations in axial alignment among the layers so that the relatively narrow joint is offset throughout the successive convolute wound layers.

10. An apparatus according to claim 8 wherein all of the textile webs have a same predetermined thickness, and wherein said welding means comprises means for pressing together the adjacent portions of the first and second textile webs so that the joint has a thickness less than the predetermined thickness of the textile webs.

11. An apparatus according to claim 10 wherein said welding means further comprises trimming means for trimming portions of heat fused material from the joint so that the joint has a relatively narrow width outward from the textile fabric less than about five times the predetermined thickness of the textile webs.

12. An apparatus according to claim 8 wherein said feeder means comprises means for relatively positioning the first and second textile webs so that respective first longitudinal edges of the first and second textile webs are generally aligned with each other.

13. An apparatus according to claim 12 wherein said welding means comprises an ultrasonic horn and an anvil cooperating therewith to form the joint from respective first longitudinal edge portions of the first and second textile webs.

14. An apparatus according to claim 12 wherein said feeder means further comprises means for positioning a third textile web on the second textile web so that a longitudinal edge of the third textile web is generally aligned with a second longitudinal edge of the second textile web; wherein said welding means further comprises means for forming a second relatively narrow flexible joint between the second and third textile webs by heat fusing together adjacent respective edge portions thereof; and wherein said unfolding frame comprises means for unfolding the second and third textile webs about the second joint so that the third textile web lies in the common plane with the first and second textile webs to further define the relatively wide textile fabric.

15. An apparatus for forming a convolute roll of a relatively wide textile fabric by joining together a plurality of textile webs in side-by-side relation, each of the textile webs comprising heat fusible nonwoven textile material, said apparatus comprising:

feeder means for positioning a first textile web overlying a second textile web and advancing the textile webs along a predetermined path of travel;

ultrasonic welding means positioned along the predetermined path of travel for forming a relatively narrow flexible joint between the first and second textile webs by heat fusing together adjacent portions thereof, said ultrasonic welding means comprising an ultrasonic horn and an anvil cooperating therewith to form the joint from the respective adjacent portions of the first and second textile webs;

an unfolding frame positioned downstream from said ultrasonic welding means for unfolding the first and second textile webs about the joint so that the textile webs lie in a common plane to define the relatively wide textile fabric and so that the relatively narrow flexible joint extends outwardly from adjacent portions of the relatively wide textile fabric; and take-up means positioned downstream from said unfolding frame to wind the relatively wide textile fabric into successive convolute wound layers with the relatively narrow flexible joint folded to lie flat between successive layers so that the successive convolute wound layers define a cylindrical convolute roll being devoid of a substantial bulge at the joint.

16. An apparatus according to claim 15 wherein said take-up means comprises means for winding successive convolute wound layers of the textile fabric with variations in axial alignment among the layers so that the relatively narrow joint is offset throughout the successive convolute wound layers.

17. An apparatus according to claim 15 wherein all of the textile webs have a same predetermined thickness, and wherein said ultrasonic welding means further comprises means for pressing together the adjacent portions of the first and second textile webs so that the joint has a thickness less than a thickness of the first and second textile webs.

18. An apparatus according to claim 17 wherein said ultrasonic welding means further comprises trimming means for trimming portions of heat fused material at the joint so that the joint has a relatively narrow width outward from the textile fabric less than about five times the predetermined thickness of the textile webs.

19. An apparatus according to claim 15 wherein said feeder means comprises means for relatively positioning the first and second textile webs so that respective first longitudinal edges of the first and second textile webs are generally aligned with each other.

20. An apparatus according to claim 19 wherein said feeder means further comprises means for positioning a third textile web on the second textile web so that a longitudinal edge of the third textile web is generally aligned with a second longitudinal edge of the second textile web; wherein said ultrasonic welding means further comprises means for forming a second relatively narrow flexible joint between the second and third textile webs by heat fusing together adjacent respective edge portions thereof; and wherein said unfolding frame comprises means for unfolding the second and third textile webs about the second joint so that the third textile web lies in the common plane with the first and second textile webs to further define the relatively wide textile fabric.

21. An apparatus for forming a convolute roll of a relatively wide textile fabric by joining together first, second and third textile webs in side-by-side relation, each of the textile webs comprising heat fusible nonwoven textile material, said apparatus comprising:

feeder means for positioning the first textile web in contact with the second textile web adjacent a first longitudinal edge thereof, for positioning the third textile web in contact with the second textile web adjacent a second longitudinal edge thereof, and for advancing the textile webs along a predetermined path of travel;

welding means positioned along the predetermined path of travel for forming first and second relatively narrow flexible joints between the first and second textile webs and the third and second textile webs, respectively, by heat fusing together respective adjacent portions of the textile webs;

an unfolding frame positioned downstream from said welding means for unfolding the first and third webs about the respective first and second joints so that all of the textile webs lie in a common plane to define the relatively wide textile fabric and so that the first and second relatively narrow flexible joints extend outwardly from respective adjacent portions of the relatively wide textile fabric; and take-up means positioned downstream from said unfolding frame to wind the relatively wide textile fabric into successive convolute wound layers with the first and second relatively narrow flexible joints folded to lie flat between successive layers so that the successive convolute wound layers define a cylindrical convolute roll being devoid of substantial bulges at the joints.

22. An apparatus according to claim 21 wherein said take-up means comprises means for winding successive convolute wound layers of the textile fabric with variations in axial alignment among the layers so that each of the relatively narrow joints is offset throughout the successive convolute wound layers.

23. An apparatus according to claim 21 wherein all of the textile webs have a same predetermined thickness, and wherein said welding means further comprises means for compressing the adjacent portions of the first and second textile webs and adjacent portions of the second and third textile webs so that the respective first and second joints each have a thickness less than the predetermined thickness of the textile webs.

24. An apparatus according to claim 23 wherein said welding means comprises trimming means for trimming predetermined portions of heat fused material at the first and second joints so that each of the joints has a relatively narrow width of less than about five times the predetermined thickness of the textile webs.

25. An apparatus according to claim 21 wherein said feeder means further comprises means for generally aligning a longitudinal edge of the first textile web with a first longitudinal edge of the second textile web and for generally aligning a first longitudinal edge of the third textile web with a second longitudinal edge of the second textile web.

26. An apparatus according to claim 25 wherein said welding means comprises a respective ultrasonic horn and an anvil cooperating therewith to form each of the first second joints from respective edge portions of the respective textile webs.

* * * * *